United States Patent [19]
Mori

[11] Patent Number: 4,711,513
[45] Date of Patent: * Dec. 8, 1987

[54] LIGHT RADIATOR FOR DIFFUSING LIGHT RAYS WHICH HAVE BEEN TRANSMITTED THROUGH AN OPTICAL CONDUCTOR

[76] Inventor: Kei Mori, 3-16-3-501, Kaminoge, Setagaya-ku, Tokyo, Japan

[*] Notice: The portion of the term of this patent subsequent to Sep. 2, 2003 has been disclaimed.

[21] Appl. No.: 760,200

[22] Filed: Jul. 29, 1985

[30] Foreign Application Priority Data

Aug. 8, 1984 [JP] Japan ............................ 59-166082

[51] Int. Cl.$^4$ ........................... C02B 6/00; F21V 7/04
[52] U.S. Cl. .............................. 350/96.10; 350/96.15; 362/22
[58] Field of Search ............... 350/96.10, 96.15, 96.20; 362/32

[56] References Cited

U.S. PATENT DOCUMENTS

| 4,344,110 | 8/1982 | Ruediger | 362/32 |
| 4,459,642 | 7/1984 | Mori | 362/32 |
| 4,609,974 | 9/1986 | Mori | 362/96 X |

FOREIGN PATENT DOCUMENTS

| 0069977 | 1/1983 | European Pat. Off. | 362/32 |
| 2806076 | 8/1979 | Fed. Rep. of Germany | 362/32 |
| 0077741 | 6/1977 | Japan | 350/96.19 |

*Primary Examiner*—Eugene R. LaRoche
*Assistant Examiner*—James C. Lee
*Attorney, Agent, or Firm*—Jordan and Hamburg

[57] ABSTRACT

A light radiator for effectively diffusing and radiating light rays outside of the optical conductor cable through which they were transmitted. The light radiator comprises a transparent cylinder, an optical conductor for guiding light rays into the cylinder, an optical means movably accommodated inside of the cylinder for reflecting the light rays guided into the cylinder and radiating outside of the cylinder, and a driving means for moving the optical means along the axis of the cylinder. The optical means is constructed with a cylindrical transparent member, a surface of one side on which the light rays impinge being formed on a plane and another surface of the other side being formed in a V-shaped concave surface.

2 Claims, 7 Drawing Figures

LIGHT RADIATOR FOR DIFFUSING LIGHT RAYS WHICH HAVE BEEN TRANSMITTED THROUGH AN OPTICAL CONDUCTOR

BACKGROUND OF THE INVENTION

The present invention refers to a light radiator for effectively diffusing and radiating light rays outside of the optical conductor cable through which they were transmitted.

The present application has previously proposed various ways to focus solar rays or artificial light rays through the use of lenses or the like, in order to guide them into an optical conductor cable, and thereby transmitting them onto an optional desired place. The solar rays or artificial light rays transmitted and emitted in such a way are employed for photo-synthesis and for use in illumination or for other like purposes such as for promoting the growth of plants.

However, in the case of utilizing light energy for cultivating plants, the light rays transmitted through the optical conductor cable have directional characteristics. Supposing that the end portion of the optical conductor cable is cut off and the light rays are emitted therefrom, then the radiation angle for the focused light rays is, in general, equal to about 46°. That is quite a narrow field. In the case of utilizing the light energy as described above, it is impossible to perform a desirable amount of illumination by simply cutting off the end portion of the optical conductor cable and by letting the light rays emit from it.

Therefore, the present applicant has already proposed various kinds of light radiators capable of effectively diffusing light rays which have been transmitted through an optical conductor cable and by radiating the same for the purpose of illumination over a desired area.

SUMMARY OF THE INVENTION

It is an object of the present invention to provide a light radiator capable of effectively emitting solar rays or artificial light rays which have been transmitted through an optical conductor cable outside the same for preferably nurturing plants.

It is another object of the present invention to provide a light radiator in which the solar rays transmitted through the optical conductor can be effectively diffused to illuminate an area with a wider range.

It is another object of the present invention is to provide a light radiator capable of emitting light rays in two directions with the construction of an improved conventional light radiator in order to nurture plants much more effectively.

The above-mentioned features and other advantages of the present invention will be apparent from the following detailed description which goes with the accompanying drawings.

DESCRIPTION OF THE PREFERRED EMBODIMENTS

Figures 1, 2:
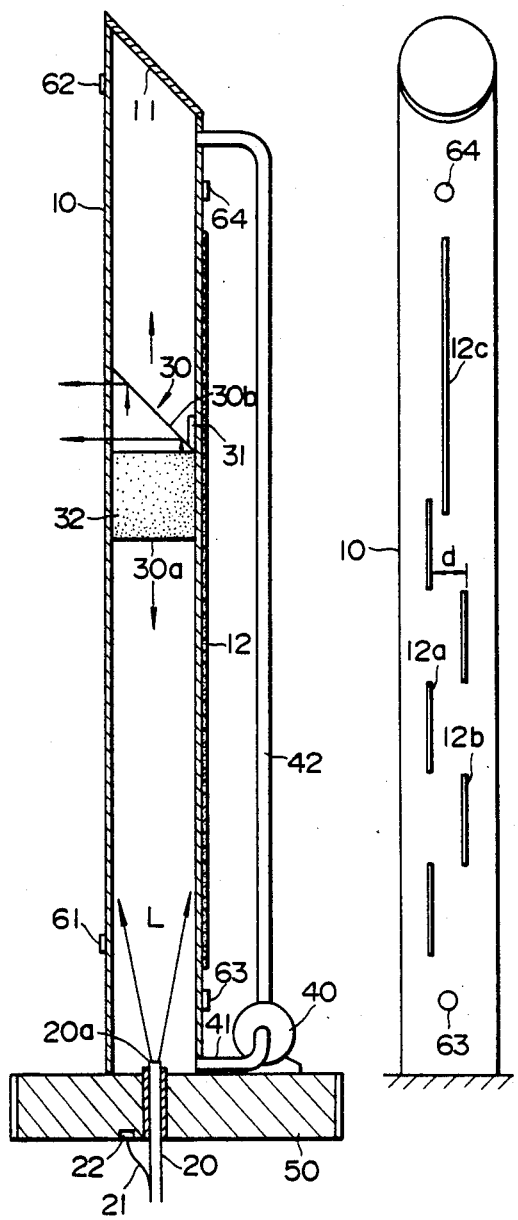
FIG. 1 is a cross-sectional view showing an embodiment of a light radiator previously proposed by the present applicant.
FIG. 2 is a view showing a method of distributing the magnetic substance.

FIG. 1 is a cross-sectional view for explaining an embodiment of a light radiator previously proposed by the present applicant. In FIG. 1, 10 is a transparent cylinder, 20 an optical conductor, 30 an optical means, 40 an air pump, and 50 a foundation. The light-emitting edge 20a of the optical conductor 20 is installed at the lower end portion of the cylinder. The light rays transmitted through the optical conductor 20 are emitted into the cylinder 10 from the lightemitting edge 20a of the optical conductor 20, and transmitted upward by reflecting them on the inner and outer wall surfaces of the cylinder 10.

The transparent cylindrical optical means 30 is inserted into the cylinder 10. The lower end surface of the optical means, that is, the surface 30a at the side where light rays are transmitted, is formed on a plane while the surface 30b at the opposite side is formed on an inclined plane. Therefore, the light rays L guided into the cylinder 10 as mentioned before, enter the optical means 30 through the plane 30a of the optical means 30, and after being reflected on the inclined surface 30b at the opposite side, are then emitted outside of the cylinder 10. Trees, or the like, are grown outside of the cylinder 10. In such a manner as mentioned above, the light rays emitted from the cylinder 10 are supplied to the plants as a light source for photo-synthesis.

The open end of one pipe 41 is located at the lower end portion of the cylinder 10 and the open end of another pipe 42 is located at the upper end portion thereof. A differential pressure is applied between the lower side and the upper side of the optical means 30 by the use of pipes 41 and 42. The optical means 30 can move up and down inside the cylinder 10 through the action of the above-mentioned differential pressure and the empty weight of the optical means 30. In such a manner, it is possible to supply light rays to trees from the lower portion thereof to the upper portion thereof.

In FIG. 1, 61 and 62 are photo sensors that are mounted on the outer circumferential surface of the cylinder 10 at the side where the right rays, reflected by the optical means 30, pass through. The arrival of the optical means 10 at the lower end is detected by the photo sensor 61. The detection signal controls an air pump 40 so as to generate a differential pressure for moving the optical means upward. On the other hand, the arrival of the optical means 10 at the upper end is detected by the photo sensor 62. The detection signal controls an air pump 40 so as to generate a differential pressure for moving the optical means downward this time.

Those photo sensors 61 and 62 are constructed so as to be capable of being removed from the cylinder 10 and to be movable along the cylinder 10. In such a manner, when a tree is small the photo sensor 62 is placed at a lower position and when the tree grows and becomes taller it can be moved upward. In such a way light rays supplied by the optical conductor 20 can be effectively distributed to trees. A reflecting surface installed at the upper end of the cylinder 10 is represented by 11. The light rays leaking upward from the cylinder 10 after passing through the optical means 30 are reflected onto the reflecting surface 11 and discharged to the outside portion of the cylinder 10. In such a manner, the surface of the ceiling is illuminated.

A permanent magnet 31 is installed at a position where the light rays, which have been projected onto a reflecting surface 30b of the outer circumferential surface of the optical means 30, are not disturbed. When such a permanent magnet or magnet substance is unitarily installed on the optical means 30, it is possible to detect its position by sensing the permanent magnet or magnetic substance 31. In such a case the magnetic sensors 63 and 64 can be used instead of the afore-mentioned photo sensors 61 and 62. Furthermore, the position signal detected by the magnetic sensors 63 and 64 is used for controlling the air pump 40 as is the case for the photo sensors in order to move up and down the optical means 30.

A permanent magnet (or magnetic substance) installed on the outer surface of the cylinder 10 and elongated along the axis of the cylinder 10 is represented by 12. The optical means 30 is regulated so as to put it in a desired direction by the use of a permanent magnet or magnetic substance 12. Either one of the permanent magnets or magnetic substances 31, installed on the optical means 30 and the permanent magnet (or magnetic substance) 12 installed on the cylinder 10 are constructed together with the permanent magnet. As a consequence, a magnetic force occurs between those permanent magnets (or magnetic substances) 31 and 12. The optical means 30 therefore moves up and down through the magnetic force. The permanent magnet (or permanent substance) 31 is opposite the permanent magnet (or magnetic substance) 12 on the cylinder 10.

In the case of the embodiment shown in FIG. 1, the permanent magnet (or magnetic substance) 12 is installed in such a way that the optical means 30 moves up and down linearly without any rotational motion. When the permanent magnet (or magnetic substance) 12 is installed spirally around the cylinder 10, the optical means 30 moves up and down with a rotational motion. When the same is installed in a state of zigzag, the optical means 30 moves up and down rotatably, i.e. performing a goose-neck movement to the right and to the left.

Generally speaking branches of trees spread out widely at lower levels, but at higher levels the area narrows down. For this reason, the angle of the goose-neck movement of the optical means 30 is set wide at the lower portion of the trees and becomes gradually narrower as it nears the top. In such a manner, it will be possible to effectively supply light rays to plants. Therefore, preferably, the width of the zigzag movement is widened at the lower portion of plants and narrowed at the upper portion. Furthermore, the movement in an up-and-down direction can be slowed down at the lower portion and sped up at the upper portion.

The case for installing a magnetic substance 12 in continuous fashion has been described heretofore. However, as shown in FIG. 2, it might be possible to install two rows of magnetic substances 12a and 12b in parallel fashion and in a state of zigzag. In such a case, the distance d between those rows is widened at the lower position, and narrowed at the upper portion. For example, only one row of magnetic substance 12c is installed at the uppermost portion. When the optical means 30 moves up and down at the lower position, it performs a goose-neck movement between 12a and 12b. On the contrary, at the upper position it moves up and down in a linear way without a goose-neck motion. In such a manner, the light rays can be effectively supplied to trees.

An optical fiber diverging from the optical conductor 20 and taken outside therefrom is represented by 21. A photo sensor 22 is mounted on the tip end portion of the optical fiber 21. By means of the photo sensor 22, the light rays supplied in the optical conductor 20 are detected. At the time of detecting light rays, the pump 40 is working while at the time of nondetection it is stopped.

Silicone rubber 32 covers the outer circumferential portion of the optical means 30, where the light rays, reflected by the optical means 30, do not pass through. In such a manner, by covering the optical means 30 with the use of silicone rubber, the movement between the optical means 30 and the cylinder 10 is improved, and therefore the inner wall surface of the cylinder 10 is not damaged.

Furthermore, although an embodiment in which the optical means 30 is moved by use of air pressure is illustrated in FIG. 1, liquid pressure can be used instead of air pressure. In such a case, a liquid pump is employed in place of an air pump 40 by filling the cylinder 10 with optical oil. However, in such a procedure it is necessary to form an air layer at the inclined side 30b of the optical means 30. For this reason, the optical means 30 is constructed, for example, as shown in FIG. 3 or FIG. 4.

Figure 3:
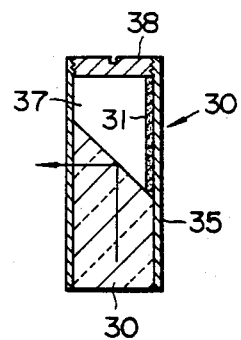
FIGS. 3 and 4 are views showing embodiments of the optical means, respectively, proposed by the present applicant.

In the embodiment shown in FIG. 3, a transparent cylindrical body 30 is tightly inserted into a transparent cylindrical tube 35. The upper portion of the transparent cylindrical body 30 is an air chamber 37. The upper end portion of the cylindrical pipe is closed by use of a cover 38.

Figure 4:
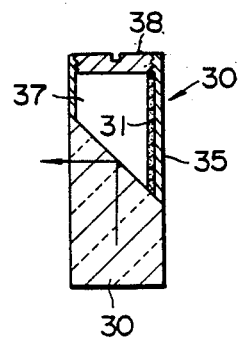

In the embodiment shown in FIG. 4, the diameter of the cylindrical tube 35 is equal to that of the transparent cylindrical body 30. Both the cylindrical tube 35 and the transparent cylindrical body 30 are joined in series to each other. In such a manner, the inclined surface of the transparent body 30 comes into contact with the air layer, and therefore the light rays guided into the transparent body 30 are reflected on the inclined surface thereof and emitted in the direction shown by an arrow.

The afore-mentioned light radiator can be set up and employed in such a manner as described heretofore. Otherwise, it can be suspended from the ceiling or the like or installed horizontally. On some occasions, the light rays emitted can be set not only in one direction but in two directions, it may be possible to supply light rays to plants much more effectively.

Figure 7:
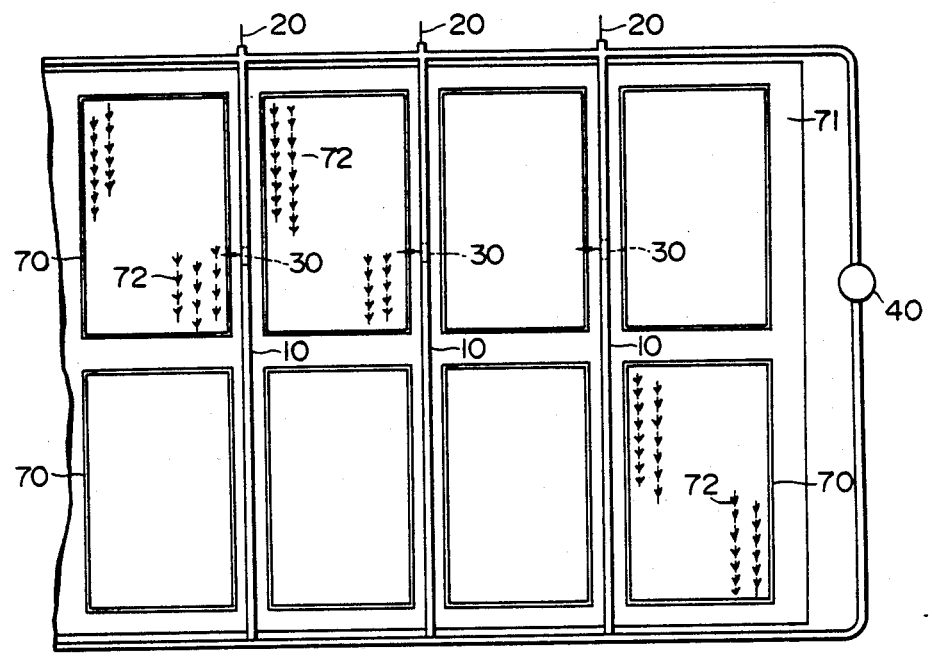
FIG. 7 is a plan view showing an embodiment according to the present invention in which the light radiator is employed for nurturing plants.

FIG. 7 is a plan view showing an embodiment in which healthy rice plant seedlings are being nurtured by the use of a light radiator as mentioned above. In FIG. 7, 10 is a transparent cylindrical pipe, 20 an optical conductor, 30 an optical means, 40 a pump, 70 a pallet for forming a seedling bed 71, and as a shelf for putting the pallets thereon. As is well known, culture soil is put in the seedling bed for sowing the soil with seeds and for nurturing the seedlings 72 thereon. In order to let the seedlings 72 grow well, a sufficient amount of light rays needed for photo synthesis must be supplied to them in addition to adequate temperature, humidity, and carbonic acid gas. The light radiator mentioned before is employed as a light source for nurturing plants.

However, in the case of the above-mentioned light radiator, the light rays emitted from the optical means 30 propagate only in one direction, and therefore only one side of the seedling bed is supplied with light rays. If the light rays are emitted from the optical means 30 so as to propagate in two directions, both sides of the seedling bed are supplied with light rays through the use of only one light radiator. Therefore, light rays can be much more effectively supplied to plants.

The present invention was made in consideration of the situation mentioned above. In particular, the primary object of the present invention is to provide a light radiator capable of emitting light rays in two directions with the construction of an improved conventional light radiator in order to nurture plants much more effectively.

Figure 5:
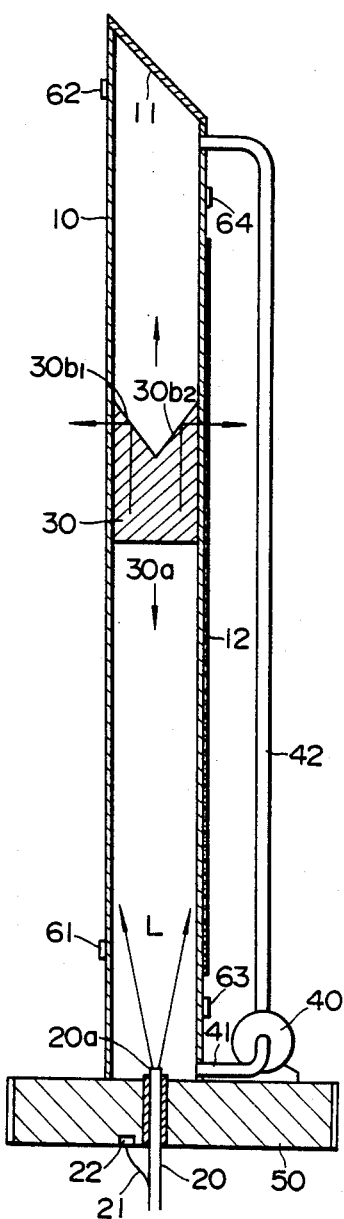
FIG. 5 is a cross-sectional view showing an embodiment of a light radiator according to the present invention.

FIG. 5 is a construction view for explaining an embodiment of a light radiator according to the present invention. In FIG. 5, the reference numeral used is the same as that of FIG. 1 and is attached to the part performing the same action as that shown in FIG. 1. However, in the present invention, the inclined surface of the optical means 30, that is, the light-emitting edge side is constructed in a state of V-shaped concave surfaces that are inclined $30b_1$ and $30b_2$. The light rays reflected on one inclined surface $30b_1$ and the light rays reflected on the other inclined surface $30b_2$ are radiated, respectively, in the reverse directions.

Figure 6:
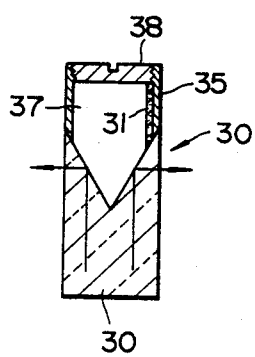
FIG. 6 is a cross-sectional view showing an embodiment of the optical means.

Consequently, in the case of employing the light radiator, for example, as a healthy seedling device as shown in FIG. 7, the light rays can be much more effectively supplied to the plants so that the seedling of the plants can be much more effectively nurtured. Furthermore, in the embodiment shown in FIG. 5, the optical means 30 is moved by use of air pressure. However, in the case of moving the optical means 30 by use of a liquid (optical oil), the inclined surface side thereof is covered liquid-tightly by a cover member 35 as shown in FIG. 6 so as to bring the inclined surface into contact with the air layer.

Fundamental embodiments of the present invention have been described heretofore. However, the present invention is not limited to the above-mentioned embodiments. Other various kinds of modifications can be realized in practice. For instance, it may be easily understood that the radiator can be applicable to optical means and was disclosed in the Japanese Patent Application Nos. 59-117241 (117241/1984), corresponding to U.S. patent application Ser. No. 734,449, 59-124299. (124299/1984) corresponding to U.S. patent application Ser. No. 743,245, and others which were proposed by the present applicant.

As is apparent from the foregoing description, according to the present invention, it is possible to provide a light radiator which is simply constructed and capable of effectively supplying light rays to plants.

I claim:

1. A light radiator comprising a transparent cylinder, an optical conductor for guiding light rays into said cylinder through one end of said cylinder, an optical means movably accommodated inside of said cylinder for reflecting said light rays guided into said cylinder from said optical conductor and radiating said light rays outside of said cylinder, and a driving means for moving said optical means along the axis of said cylinder, said optical means comprising a cylindrical transparent member, a surface of one side of said member on which the light rays impinge being formed on a plane and another surface of the other side of said member being formed as a V-shaped concave surface.

2. A light radiator as defined in claim 1, wherein said V-shaped concave surface of said member is constructed to be liquid-tight.

* * * * *